US 9,853,937 B1

(12) United States Patent
Sankaran et al.

(10) Patent No.: US 9,853,937 B1
(45) Date of Patent: *Dec. 26, 2017

(54) INTERNAL PACKET STEERING WITHIN A WIRELESS ACCESS GATEWAY

(71) Applicant: Juniper Networks, Inc., Sunnyvale, CA (US)

(72) Inventors: Krishna Sankaran, Milpitas, CA (US); Huiyang Yang, Cupertino, CA (US); Santosh Gupta, Fremont, CA (US); Prasad Chigurupati, Bangalore (IN); Bin William Hong, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/339,430

(22) Filed: Oct. 31, 2016

Related U.S. Application Data

(63) Continuation of application No. 13/957,201, filed on Aug. 1, 2013, now Pat. No. 9,485,196.

(51) Int. Cl.
*H04L 12/933* (2013.01)
*H04L 29/12* (2006.01)
(Continued)

(52) U.S. Cl.
CPC .......... *H04L 61/103* (2013.01); *H04L 49/15* (2013.01); *H04L 61/6022* (2013.01);
(Continued)

(58) Field of Classification Search
None
See application file for complete search history.

(56) References Cited

U.S. PATENT DOCUMENTS 8,127,350 B2   2/2012   Wei et al.
8,184,540 B1*  5/2012   Perla ............... H04L 47/568
                                              370/235

(Continued)

OTHER PUBLICATIONS

3GPP TR 23.852 V1.0.0 (Dec. 2011), "3rd Generation Partnership Project; Technical Specification Group Services and System Aspects; Study on S2a Mobility based on GTP & WLAN access to EPC (SaMOG); Stage 2 (Release 11)," Technical Report, Dec. 2011, 40 pp.

(Continued)

*Primary Examiner* — Vinncelas Louis
(74) *Attorney, Agent, or Firm* — Shumaker & Sieffert, P.A.

(57) ABSTRACT

In general, techniques are described for steering data traffic for a subscriber session from a network interface of a wireless access gateway to an anchoring one of a plurality of forwarding units of the wireless access gateway using a layer 2 (L2) address of the data traffic. For example, a wireless access gateway for a wireless local area network (WLAN) access network is described as having a decentralized data plane that includes multiple forwarding units for implementing subscriber sessions. Each forwarding unit may present a network interface for sending and receiving network packets and includes packet processing capabilities to enable subscriber data packet processing to perform the functionality of the wireless access gateway. The techniques enable steering data traffic for a given subscriber session to a particular one of the forwarding units of the wireless access gateway using an L2 address of the data traffic.

23 Claims, 4 Drawing Sheets

(51) Int. Cl.
    *H04W 84/12*    (2009.01)
    *H04W 88/16*    (2009.01)
(52) U.S. Cl.
    CPC ......... *H04L 2212/00* (2013.01); *H04W 84/12* (2013.01); *H04W 88/16* (2013.01)

(56) References Cited

U.S. PATENT DOCUMENTS

| | | |
|---|---|---|
| 8,339,959 B1 | 12/2012 | Moisand et al. |
| 9,485,196 B1 | 11/2016 | Sankaran et al. |
| 2008/0044181 A1 | 2/2008 | Sindhu |
| 2011/0032814 A1* | 2/2011 | Wen ..................... H04L 49/254 370/217 |
| 2011/0069701 A1 | 3/2011 | Wu |
| 2012/0317637 A1* | 12/2012 | Huang ................ H04L 61/2514 726/12 |
| 2013/0003736 A1 | 1/2013 | Szyszko et al. |
| 2013/0007237 A1 | 1/2013 | Mehta et al. |

OTHER PUBLICATIONS

U.S. Appl. No. 13/248,834, filed Sep. 9, 2011 and entitled "Mobile Gateway Having Reduced Forwarding State for Anchoring Mobile Subscribers".

Plummer, "An Ethernet address resolution protocol," Network Working Group, RFC 826, Nov. 1982, 10 pp.

Prosecution History from U.S. Appl. No. 13/957,201, from Apr. 24, 2015 through Jul. 28, 2016, 197 pp.

* cited by examiner

INTERNAL PACKET STEERING WITHIN A WIRELESS ACCESS GATEWAY

This application is a continuation of U.S. patent application Ser. No. 13/957,201, filed Aug. 1, 2013, the entire contents of which are incorporated herein by reference.

TECHNICAL FIELD

The disclosure relates to computer networks and, more specifically, to wireless access networks.

BACKGROUND

Use of wireless endpoint devices for accessing computer data networks has recently increased dramatically. These wireless endpoint devices, or more simply "wireless devices," provide a platform for both cellular phone calls and cellular-based access to computer data services. For example, a typical cellular radio access network is a collection of cells that each includes at least one base station capable of transmitting and relaying signals to subscribers' wireless devices. A "cell" generally denotes a distinct area of a mobile network that utilizes a particular frequency or range of frequencies for transmission of data. A typical base station is a tower to which are affixed a number of antennas that transmit and receive the data over the particular frequency. Wireless devices, such as cellular or mobile phones, smart phones, camera phones, personal digital assistants (PDAs) and laptop computers, may initiate or otherwise transmit a signal at the designated frequency to the base station to initiate a call or data session and begin transmitting data.

Mobile service provider networks convert cellular signals, e.g., Time Division Multiple Access (TDMA) signals, Orthogonal Frequency-Division Multiplexing (OFDM) signals or Code Division Multiple Access (CDMA) signals, received at a base station from wireless devices into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

A typical 3GPP mobile service provider network, also "mobile network" or "cellular network," includes a core packet-switched network, a transport network, and one or more radio access networks. The core packet-switched network for the mobile network establishes logical connections, known as bearers, among the many service nodes on a path between a wireless device, attached to one of the radio access networks, and a packet data network (PDN). The service nodes then utilize the bearers to transport subscriber data traffic exchanged between the wireless device and the PDN, which may include, for example, the Internet, an enterprise intranet, a layer 3 VPN, and a service provider's private network. Various PDNs provide a variety of packet-based data services to wireless devices to enable the wireless devices to exchange subscriber data with application or other servers of the PDNs. The increasing number of services available to an increasing number of mobile subscriber devices pressures available mobile network resources.

A mobile network gateway or simply "mobile gateway" is a service node of the mobile service provider network that operates as a gateway to the PDNs and functions as the anchor point for wireless device mobility. The mobile gateway applies policy and charging rules to subscriber data traffic between the PDNs and wireless devices to perform charging functionality and manage service connections to ensure an efficient utilization of core, transport, and radio network resources. Different services, such as Internet, E-mail, voice, and multimedia, have different quality of service (QoS) requirements that, moreover, may vary by subscriber.

The ubiquitous use of wireless devices and the ever-increasing desire by subscribers for fast network access has presented many challenges. For example, the ubiquitous use of cellular wireless devices have placed a high demand for data services over the service provider's mobile network, often straining the mobile network and resulting in delayed or lost data communications. Some wireless devices however, in addition to supporting connections to a PDN via a radio interface to the cellular mobile network, also (or in many cases alternatively) support wireless capabilities to exchange data by a wireless local area network access (WLAN) network that is separate from the cellular network of the mobile service provider. For example, many wireless devices include a WLAN interface that provides data service when in the presence of a Wi-Fi "hotspot" or other WLAN access point (AP), including Wi-Fi Access Points. Other examples of such wireless capabilities may include Bluetooth or Near Field Communication (NFC). When in the presence of a WLAN access network, a mobile subscriber may transition the data services of the wireless to the WLAN so as to accelerate data transmissions, reduce costs, and avoid any delays associated with the mobile service provider network. A wireless access gateway for the WLAN access network, such as a WLAN access gateway, may provide network access to the cellular mobile network by an interface with the mobile gateway.

SUMMARY

In general, techniques are described for steering data traffic for a subscriber session from a network interface of a wireless access gateway to an anchoring one of a plurality of forwarding units of the wireless access gateway using a layer 2 (L2) address of the data traffic. For example, a wireless access gateway for a wireless local area network (WLAN) access network is described as having a decentralized data or forwarding plane that includes multiple forwarding units, coupled by a high-speed switching fabric, for implementing subscriber sessions. The forwarding units typically provide multiple physical interface cards (PICs) together with one or more packet processors on a single board insertable within a wireless access gateway chassis. Each forwarding unit thus presents a network interface for sending and receiving network packets and also includes packet processing capabilities to enable subscriber data packet processing to perform the functionality of the wireless access gateway. The techniques enable steering data traffic for a given subscriber session to a particular one of the forwarding units of the wireless access gateway using an L2 address of the data traffic, where the particular forwarding unit to which the data traffic is steered provides subscriber-specific packet processing to the data traffic.

For example, as part of establishing a subscriber session for a wireless device requesting services of the wireless local area network (LAN) access network, the wireless access gateway device selects one of the multiple forwarding units to anchor the subscriber session and thus process subscriber data traffic associated with the subscriber session. In one example implementation, to facilitate internal steering of upstream subscriber data traffic to the anchor forwarding unit for the subscriber session, in response to an Address Resolution Protocol (ARP) request issued by the wireless device to resolve the default gateway layer 3 (L3) address of the wireless access gateway, the wireless access gateway replies with an L2 address for the wireless device that is associated with the anchor forwarding unit but not associated with any of the other forwarding units, i.e., unique to the anchor forwarding unit. Consequently, any forwarding unit of the multiple forwarding units that receives subscriber data traffic for the subscriber session may determine the anchor forwarding unit using the destination L2 address of the subscriber data traffic and then internally steer the subscriber data traffic to the anchor forwarding unit. Because the number of forwarding units of a wireless access gateway can be many orders of magnitude smaller than the number of unique wireless devices accessing network services by the wireless access gateway, internally steering subscriber data traffic using destination L2 addresses rather than source L3 addresses for the wireless devices may in this way reduce time and resources needed for anchoring forwarding unit lookups.

In one aspect, a method performed by a wireless access gateway of a wireless local area network (WLAN) access network includes receiving, from a wireless endpoint device, a packet by an ingress forwarding unit of a plurality of forwarding units internal to the wireless access gateway, wherein each of the plurality of forwarding units is uniquely associated with a different layer 2 (L2) address, wherein the wireless access gateway includes an upstream interface for a mobility tunneling protocol to a mobile gateway of a mobile service provider network. The method also includes determining, by the ingress forwarding unit, a destination L2 address of the packet. The method further includes determining, by the ingress forwarding unit and for the packet received from the wireless endpoint device, an anchor forwarding unit of the plurality of forwarding units that is uniquely associated with the destination L2 address of the packet received from the subscriber device. The method also includes forwarding the packet from the ingress forwarding unit to the anchor forwarding unit based at least on determining the anchor forwarding unit. The method further includes processing, by the anchor forwarding unit, the packet using a subscriber session context for a subscriber session associated with the packet.

In another aspect, a wireless access gateway for a wireless local area network access network comprises a plurality of forwarding units internal to the wireless access gateway, wherein each of the plurality of forwarding units internal to the wireless access gateway is uniquely associated with a different layer 2 (L2) address. The wireless access gateway also comprises an upstream interface for a mobility tunneling protocol to a mobile gateway of a mobile service provider network. An ingress one of the plurality of forwarding units is configured to receives a packet from a wireless endpoint device. The ingress forwarding unit is also configured to determine a destination L2 address of the packet. The ingress forwarding unit is also configured to determine, for the packet received from the wireless endpoint device, an anchor forwarding unit of the plurality of forwarding units that is uniquely associated with the destination L2 address of the packet received from the wireless endpoint device. The ingress forwarding unit is also configured to forward the packet to the anchor forwarding unit based at least on determining the anchor forwarding unit. The anchor forwarding unit is configured to process the packet using a subscriber session context for a subscriber session associated with the packet.

In another aspect, a non-transitory computer-readable medium stores instructions. The instructions cause one or more programmable processors to receive, by wireless access gateway for a wireless local area network access network, the wireless access gateway comprising a plurality of internal forwarding units, a packet from a wireless endpoint device at an ingress forwarding unit of the plurality of forwarding units, wherein each of the plurality of forwarding units is uniquely associated with a different layer 2 (L2) address, and wherein the wireless access gateway includes an upstream interface for a mobility tunneling protocol to a mobile gateway of a mobile service provider network. The instructions further cause the programmable processors to determine, by the ingress forwarding unit, a destination L2 address of the packet. The instructions also cause the programmable processors to determine, by the ingress forwarding unit and for the packet received from the wireless endpoint device, an anchor forwarding unit of the plurality of forwarding units that is uniquely associated with the destination L2 address of the packet received from the subscriber device. The instructions further cause the programmable processors to forward the packet from the ingress forwarding unit to the anchor forwarding unit based at least on determining the anchor forwarding unit. The instructions also cause the programmable processors to process, by the anchor forwarding unit, the packet using a subscriber session context for a subscriber session associated with the packet.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
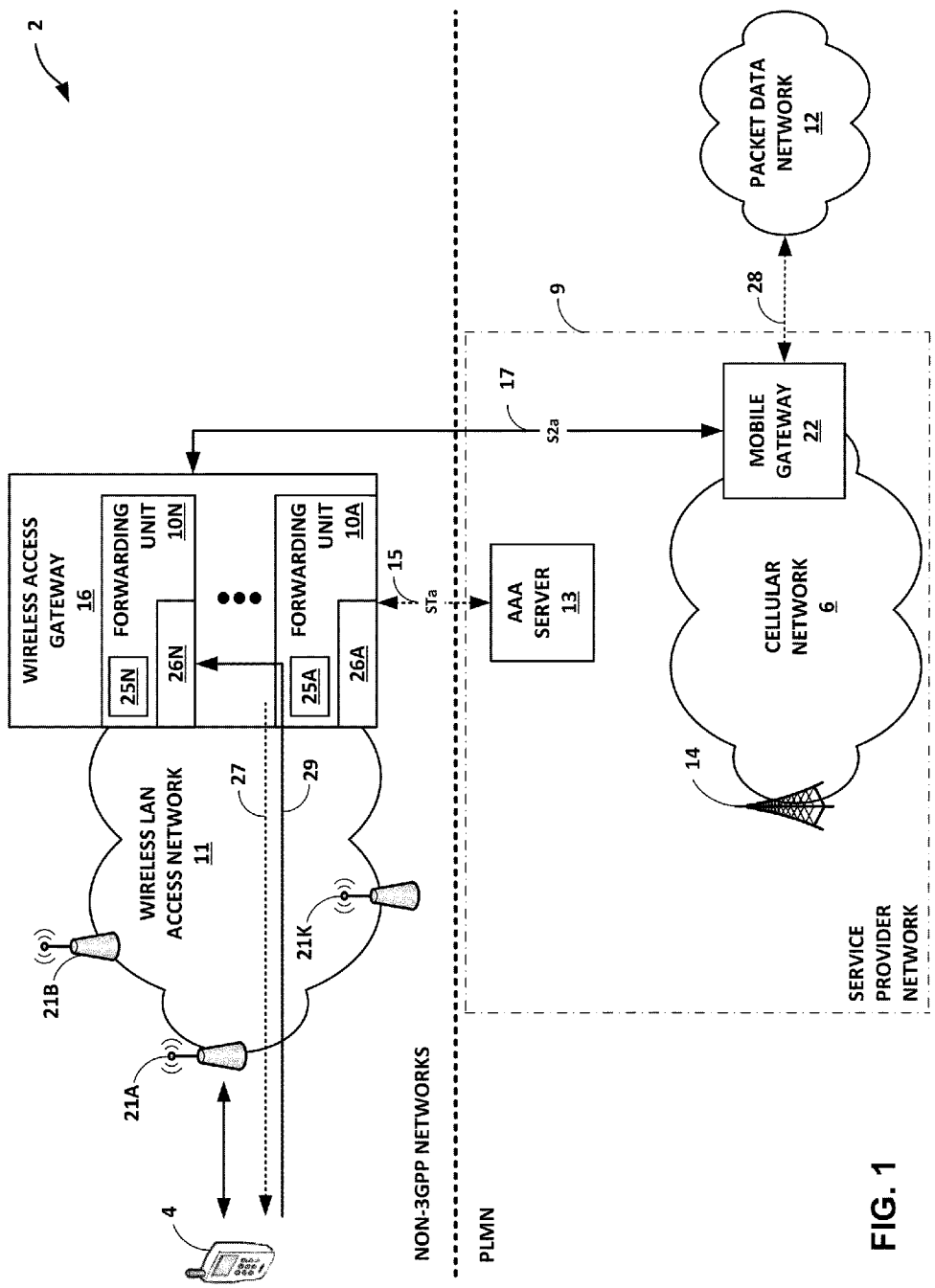
FIG. 1 is a block diagram illustrating an example network system in which a wireless access gateway with a decentralized forwarding plane operates in accordance with the described techniques.

FIG. 1 is a block diagram illustrating an example network system in which a wireless access gateway with a decentralized forwarding plane operates in accordance with the described techniques. In the example of FIG. 1, network system 2 includes network components that enable a wireless endpoint device 4 (or more simply, "wireless device 4") to attach to a wireless local area network (WLAN) access network 11 that provides network access services to packet data network (PDN) 12 by mobile service provider network 9 (hereinafter, "SP network 9"). Network system 2 includes an example SP network 9 having a cellular network 6 that allows data communications between wireless device 4 and PDN 12. SP network 9 is an example of a Public Land Mobile Network (PLMN) and may be a Home PLMN for a subscriber associated with wireless device 4.

Packet data network 12 supports one or more packet-based services that are available for request and use by wireless device 4. As examples, PDN 12 may provide, for example, bulk data delivery, voice over Internet protocol (VoIP), Internet Protocol television (IPTV), Short Messaging Service (SMS), Wireless Application Protocol (WAP) service, or customer-specific application services. Packet data network 12 may include, for instance, a local area network (LAN), a wide area network (WAN), the Internet, a virtual LAN (VLAN), an enterprise LAN, a layer 3 virtual private network (VPN), an Internet Protocol (IP) intranet operated by the mobile service provider that operates SP network 9, an enterprise IP network, or some combination thereof. In various embodiments, PDN 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet-based transport of PDN 12 services.

Wireless device 4 represents any mobile communication device that supports local wireless (e.g., "WiFi") network access, e.g., by way of a wireless LAN interface using any of the IEEE 802.11 communication protocols. Wireless device 4 may optionally support cellular radio access for communication with base station 14 that represents a radio access network of SP network 9. Wireless device 4 may represent, for example, a mobile telephone; a laptop, tablet, or other mobile computer optionally including, e.g., a 3G/4G wireless card; a smart phone; or a personal data assistant (PDA) having WLAN communication and optional cellular communication capabilities. Wireless device 4 may run one or more software applications, such as VoIP clients, video games, videoconferencing, E-mail, and Internet browsers, among others. Certain applications running on wireless device 4 may require access to services offered by PDN 12, such as mobile calls, video games, videoconferencing, and email, among others. Wireless device 4 may also be referred to, in various architectural instances, as a User Equipment (UE) or a mobile station (MS). One example of a wireless device is described in U.S. patent application Ser. No. 12/967,977, filed Dec. 14, 2010, and entitled "MULTI-SERVICE VPN NETWORK CLIENT FOR WIRELESS DEVICE," incorporated herein by reference. Wireless device 4 may optionally store a unique identifier such as an International Mobile Subscriber Identity (IMSI) or an International Mobile Equipment Identity (IMEI) stored, for instance, in a subscriber identity module (SIM) or in a memory or integrated circuit of wireless device 4.

A service provider operates SP network 9 to provide network access, data transport and other services. SP network 9 includes base station 14 and cellular network 6. In some instances, SP network 9 includes PDN 12 that, in such instances, offers service provider IP services such as IP Multimedia Subsystem (IMS), Packet Switch Streaming (PSS), and/or Multimedia Broadcast/Multicast Service (MBMS) User Service.

The service provider provisions and operates cellular network 6 to provide cellular-based network access, data transport and other services to cellular mobile devices, which may include wireless device 4. In general, cellular network 6 may implement any commonly defined cellular network architecture including those defined by standards bodies, such as the Global System for Mobile communication (GSM) Association, the $3^{rd}$ Generation Partnership Project (3GPP), the $3^{rd}$ Generation Partnership Project 2 (3GPP/2), the Internet Engineering Task Force (IETF), and the Worldwide Interoperability for Microwave Access (WiMAX) forum. For example, cellular network 6 may represent one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GPP. Cellular network 6 may, alternatively or in conjunction with one of the above, implement a code division multiple access-2000 ("CDMA2000") architecture. Cellular network 6 may, again as an alternative or in conjunction with one or more of the above, implement a WiMAX architecture defined by the WiMAX forum. As used herein, "cellular-based services" or "3GPP-based services" refer to services, including network access, provided by any of the above or similar architectures. By contrast, non-cellular-based services or "non-3GPP-based services" refer to services provided by other architectures, such as WLAN access network architectures represented by wireless LAN access network 11 (alternatively, "WLAN access network 11").

Cellular network 6 includes mobile gateway 22 that operates as a gateway to PDN 12 by Gi/SGi interface 28 over a physical communication link and in various other examples may operate as a gateway to other PDNs. Mobile gateway 22 may represent a Gateway GPRS Support Node (GGSN), PDN Gateway (PGW), Packet Data Gateway (PDG), and/or other mobile access gateway to a packet data network. Mobile gateway 22 may provide packet routing and switching, as well as mobility management, authentication, and subscriber session management for wireless device 4 using a "subscriber session." The packet-switched services provided by mobile gateway 22 may further include call handling services, signaling, billing, and internetworking between cellular network 6 and external networks, such as PDN 12.

Wireless LAN access gateway 16 (illustrated and described hereinafter as "wireless access gateway 16") in cooperation with mobile gateway 22 establishes a subscriber session for wireless device 4 that determines operations performed by mobile gateway 22 and wireless access gateway 16 on subscriber packets associated with the subscriber session. In general, a subscriber session comprises one or more packet flows for a given wireless device 4 and is an association between SP network 9 and wireless device 4 (or any other wireless device) that is identifiable by a combination of a wireless device 4 PDP address and an Access Point Name (APN) for a service provided by PDN 12, although SP network 9 may use a default APN in cases where wireless device 4 or a subscriber profile for wireless device 4 does not specify an APN. A subscriber session (alternatively referred to herein as a "connectivity access network (CAN) session," "service session," or "session") is thus a service-specific (as specified by the APN) session for a service provided to the associated one of wireless device 4. In an IP-based SP network 9, a subscriber session is an IP-CAN session.

In the illustrated example, a subscriber associated with wireless device 4 connects to wireless LAN access network 11 to receive data services. Wireless LAN access network 11 may be considered by SP network 9 as a trusted non-3GPP access network and may represent, for example, a WLAN or Wi-Fi network using any of the IEEE standards that govern wireless networking transmission methods, such as IEEE 802.1a, 802.11b, 802.11g, and/or 802.11n. While described as a "wireless" LAN access network 11, wireless LAN access network 11 may further include wired (or "wireline") communication links and intermediate network devices that communicatively couple access points 21 and wireless access gateway 16. In the example of FIG. 1, wireless LAN access network 11 includes access points 21A-21K (collectively, "access points 21"), to which wireless device 4 can attach in order to access the services available through PDN 12. As illustrated in FIG. 1, wireless device 4 attaches to wireless LAN access network 11 by access point 21A. Wireless LAN access network 11 may include one or more wireless LAN controllers (WLCs) (not shown) that each aggregates one or more of access points 21 and may perform association and/or authentication of wireless device 4 as well as switching packets between wireless clients and wired portions of wireless LAN access network 11.

WLAN access network 11 also includes wireless access gateway 16 that interfaces to mobile gateway 22 to provide wireless device 4 with access to SP network 9. Wireless access gateway 16 may additionally authenticate wireless device 4 using AAA server 13 of SP network 9 to provide trusted access to SP network 9. In some examples, wireless access gateway 16 may represent a SaMOG-based gateway. SaMOG techniques are described further in "Study on S2a Mobility based On GTP & WLAN access to EPC (SaMOG)," 3rd Generation Partnership Project, Technical Specification Group Services and System Aspects, Stage 2 (Release 11), which is incorporated by reference in its entirety herein. In some cases, the service provider of SP network 9 operates and manages the wireless access gateway 16. In such cases, the wireless access gateway 16 may be considered a component of SP network 9. In some cases, wireless access gateway 16 is part of an enterprise network that, e.g., contracts with SP network 9 to receive network services.

Wireless access gateway 16 interfaces to mobile gateway 22 and AAA server 13 by S2a interface 17 and STa interface 15, respectively. STa interface 15 (also referred to as an STa reference point) connects WLAN access network 11 with AAA server 15 and transports access authentication, authorization, and optionally mobility parameters and charging-related information. S2a interface 17 and STa interface 15 may operate over a backhaul IP network connecting wireless access gateway 16 and mobile gateway 22. S2a interface 17 (also referred to as an S2a reference point) is an interface for a mobility tunneling protocol such as GPRS Tunneling Protocol (GTP) or Proxy Mobile IP (PMIP) interface and is thus similar to a Gn interface of a UMTS network or to an S5/S8 interface of an LTE network. S2a interface 17 is described hereinafter as GTP-based. In some cases, S2a interface 17 represents an S2b and/or SWn reference point/interface, or other identified interface for another mobility tunneling protocol. Wireless access gateway 16 may thus incorporate and perform both the Trusted WLAN AAA Proxy (TWAP) and Trusted WLAN Access Gateway (TWAG) functions for alternate access network 11.

Wireless access gateway 16 includes a decentralized data or forwarding plane in that packet processing/forwarding functionality is distributed among a plurality of forwarding units 10A-10N (collectively, "forwarding units 10"). Forwarding units 10 internally forward subscriber data traffic among one another from an ingress interfaces for the traffic to egress interfaces for the traffic. Reference herein to "subscriber data traffic" or simply "data traffic" refers to one or more data packets associated with wireless device 4 and a corresponding subscriber to SP network 9. A subscriber to SP network 9 may include any individual or entity receiving services from SP network 9 and not merely those having a pre-existing contractual relationship with the service provider. At least one of forwarding units 10 includes an interface with WLAN access network 11, and at least one of forwarding units 10 implements S2a interface for exchanging encapsulated subscriber data traffic with mobile gateway 22.

Each of forwarding units 10 includes hardware or a combination of hardware and software that forwards subscriber data traffic, in accordance with forwarding information, between WLAN access network 11 and mobile gateway 22. One or more physical interface cards (PICs) together with one or more packet processors reside on each of forwarding units 10, which are insertable within the wireless access gateway 16 chassis. Each forwarding unit 10 thus presents a network interface for sending and receiving subscriber data traffic and also includes packet processing capabilities to enable subscriber data packet processing with respect to subscriber sessions to perform aspects of wireless access gateway functionality. However, as described below with respect to FIG. 2, the term "forwarding unit" may in some cases refer to a packet processor of a line card insertable within the wireless access gateway 16 chassis.

Subscriber session contexts 26A-26N (collectively, "session contexts 26") stored by respective forwarding units 10A-10N include, for one or more subscriber sessions anchored by the respective forwarding unit, session context information (or "session data") that specifies data plane operations for subscriber data traffic associated with the subscriber session. Session contexts 26B of forwarding unit 10B stores, for example, context data for one or more subscriber sessions anchored by forwarding units 10B. A forwarding unit 10 "anchors" a subscriber session in the decentralized data plane of wireless access gateway 16 by processing subscriber data traffic associated with the subscriber session using the context data of a session context 26 for the subscriber session to perform the specified data plane operations. For example, forwarding unit 10A may receive, from WLAN access network 11, a packet associated with a subscriber session anchored by forwarding unit 10B. Forwarding unit 10A therefore internally forwards the packet to forwarding unit 10B for processing using context data of a session context of session contexts 26B. Forwarding unit 10B may output the packet on an interface associated with forwarding unit 10B or, if necessary, internally forward the packet to another forwarding unit 10 (e.g., forwarding unit 10N) that is associated with the output interface determined for the packet. Forwarding units 10 include respective data link or layer 2 (L2) addresses 25A-25N (collectively, "L2 addresses 25") that identify the forwarding units 10 to one another. Each of L2 addresses 25 may represent a MAC address. In this way, each of L2 addresses 25 is associated with one and only one of forwarding units 10.

In accordance with techniques described herein, wireless access gateway 16 dynamically selects forwarding unit 10N, in this example, to anchor the subscriber session for wireless device 4 and provides, to wireless device 4, the L2 address 25N for forwarding unit 10N to use as the L2 address for wireless access gateway 16. Wireless access gateway 16 may provide the L2 address 25N to wireless device 4 in reply 27, which may represent an Address Resolution Protocol (ARP) reply. Each of forwarding units 10 that receive L2 packets from wireless LAN network 11 internally steer the L2 packets to corresponding, anchoring ones of forwarding units 10 according the destination L2 addresses of the L2 packets, which will be L2 addresses 25 that identify the anchoring forwarding units 10 for the L2 packets. As a result, regardless of which of forwarding units 10 receives subscriber data traffic for wireless device 4 (i.e., is an ingress forwarding unit 10 for such subscriber data traffic), forwarding units 10 may steer the subscriber data traffic for a subscriber session to the anchoring forwarding unit 10 of a wireless access gateway using the L2 destination address of the data traffic.

Accordingly, in the illustrated example, forwarding unit 10A receives subscriber data traffic in the form of an L2 packet 29 sourced by wireless device 4 and destined for L2 address 25N. L2 packet may in some cases represent a virtual LAN packet (IEEE 802.1q) for a virtual LAN implemented by wireless LAN access network 11. Forwarding unit 10A determines that the destination L2 address for the L2 packet 29 is L2 address 25N, determines the L2 address 25N is associated with forwarding unit 10N, and internally steers (i.e., forwards) the L2 packet 29 to forwarding unit 10N for processing using subscriber sessions 26A. Because the number of forwarding units 10 of wireless access gateway 16 can be many orders of magnitude smaller than a number of unique wireless devices accessing network services by wireless access gateway 16, internally steering subscriber data traffic using destination L2 addresses rather than source L3 addresses for the wireless devices may in this way reduce time and resources needed for anchoring forwarding unit lookups.

Figure 2:
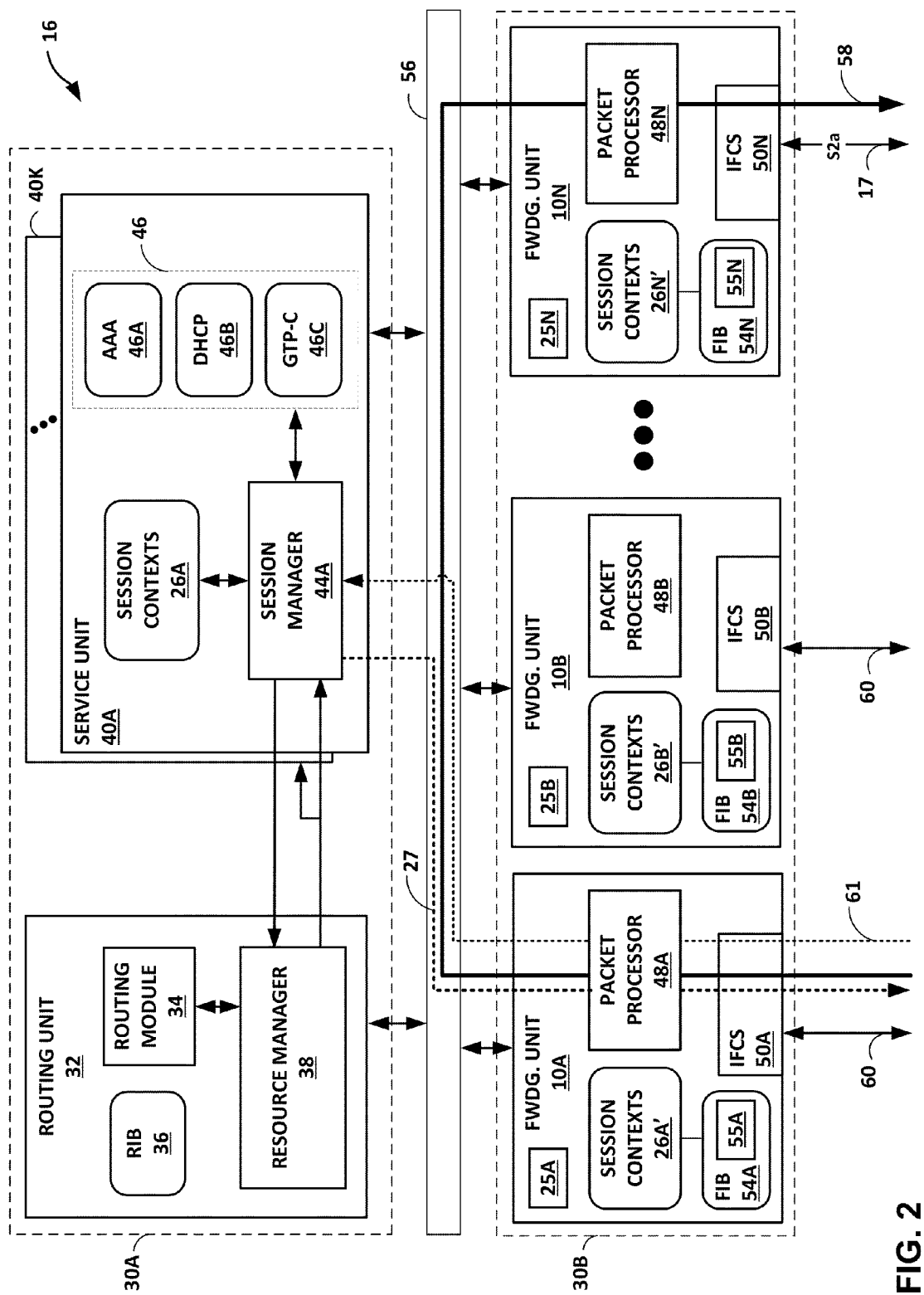
FIG. 2 is a block diagram illustrating an example wireless access gateway that internally steers subscriber data traffic according to techniques described in this disclosure.

FIG. 2 is a block diagram illustrating an example wireless access gateway that internally steers subscriber data traffic according to techniques described in this disclosure. In this example, wireless access gateway 16 is divided into two logical or physical "planes" to include a first control plane 30A and a second "data" or "forwarding" plane 30B. That is, wireless access gateway 16 implements two separate functionalities, e.g., the routing/control and forwarding/data functionalities using physically separated hardware components that either statically implement the functionality in hardware or dynamically execute software to implement the functionality.

Control plane 30A is a decentralized control plane in that control plane functionality is distributed among routing unit 32 and a plurality of subscriber management service units 40A-40K (illustrated as "service units 40"). Similarly, data plane 30B in this example is a distributed data plane in that packet processing and forwarding functionality is distributed among a plurality of forwarding units 10A-10N (illustrated as "fwdg. units 10A-10N" and collectively referred to as "forwarding units 10") internal to wireless access gateway 16. Each of routing unit 32, subscriber management service units 40, and forwarding units 10 may include one or more processors (not all processors shown in FIG. 2) that execute software instructions, such as those used to define a software or computer program, stored to a computer-readable storage medium (not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, each of routing unit 32, subscriber management service units 40, and forwarding units 10 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Switch 56 couples routing unit 32, subscriber management service units 40, and forwarding units 10 to deliver data units and control messages among the units. Switch 56 may represent an internal switch fabric or cross-bar, bus, or link. Examples of high-speed multi-stage switch fabrics used as a data plane to relay packets between units within a router are described in U.S. Patent Application 2008/0044181, entitled "MULTI-CHASSIS ROUTER WITH MULTIPLEXED OPTICAL INTERCONNECTS." The entire contents of U.S. Patent Application 2008/0044181 are incorporated herein by reference. Switch 56 may implement an Ethernet or other type of L2 network.

Data plane 30B represents hardware or a combination of hardware and software that forward network traffic in accordance with forwarding information. In the example wireless access gateway 16 of FIG. 2, data plane 30B includes forwarding units 10 that provide high-speed forwarding of subscriber data traffic received by interface cards 50A-50N ("IFCs 50") by WLAN access network interfaces 60 AND S2a reference point 17. More particularly, interface cards 50A, 50B interface with WLAN access network interfaces 60, and forwarding units 10A, 10B therefore implement interfaces for L2 forwarding between wireless access gateway 16 and downstream access points and/or WLCs. Interface cards 50N interface with reference point S2a connecting wireless access gateway 16 to a mobile gateway, and forwarding unit 10N therefore implements protocol interfaces for user plane tunneling and tunnel management between wireless access gateway 16 and a mobile gateway (e.g., mobile gateway 22 of FIG. 1). Each of interface cards 50 includes one or more outbound interfaces that couple to physical communication links to external devices that are capable of carrying subscriber control and data traffic.

Forwarding units 10 receive and forward control and data packets via switch 56 along internal forwarding paths to anchoring units for the control and data packets. Forwarding units 10 may each include one or more packet forwarding engines ("PFEs") coupled to one or more interface cards 50 and may each represent, for example, a dense port concentrator (DPC), modular port concentrator (MPC), flexible physical interface card (PIC) concentrator (FPC), or another line card, for example, that is insertable within a wireless access gateway 16 chassis or combination of chassis. In some cases, reference to a "forwarding unit" refers to a single packet processor (e.g., a PFE) of a line card and in such cases a single line card may have one or more forwarding units. Interface cards 50A, for instance, may include multiple PICs that each includes one or more inbound/outbound interfaces.

Each of forwarding units 10 may include substantially similar components to perform substantially similar functionality, said components and functionality being described hereinafter primarily with respect to forwarding unit 10A. Internally, each of forwarding units 10 may include a unique identifier that identifies the forwarding unit to other components of wireless access gateway 16. Forwarding units 10 identifiers may include an index, slot, identifying string, internal IP address, interface identifier such as an outbound interface identifier, or link layer address, for instance. In some embodiments, inbound and outbound interfaces (e.g., ports) of interface cards 50 may be specified by identifying the port type, a slot in a wireless access gateway 16 chassis for the corresponding one of forwarding units 10, a PIC, and a port number. For example, GigE-3/1/2 identifies port 2 of PIC 1 on the one forwarding units 10 that occupies slot 3 in the wireless access gateway 16 chassis, and the port is a Gigabit Ethernet port.

Forwarding unit 10A includes a packet processor 48A that receives control and data session traffic via IFC card 50A and, if necessary, internally forwards the traffic to the anchoring one of subscriber management service units 40 (control traffic) or to the anchoring one of forwarding units 10 (data traffic) according to internal routes installed to forwarding information base 54A. Further details regarding internal packet forwarding are found in U.S. patent application Ser. No. 13/248,834, filed Sep. 9, 2011 and entitled "MOBILE GATEWAY HAVING REDUCED FORWARDING STATE FOR ANCHORING MOBILE SUBSCRIBERS," the entire contents being incorporated by reference herein.

According to the techniques herein described, forwarding units 10 may be configured with respective L2 addresses 25. Resource manager 38 of routing unit 32 may configure forwarding units with L2 addresses 25. Each of L2 addresses 25 is a MAC or other type of L2 address that forwarding units 10 use to internally steer packets toward anchoring forwarding units 10 by switch 56. Each of forwarding units 10 is configured with one of lookup tables 55A-55N. Lookup table 55A maps at L2 addresses 25B-25N for at least forwarding units 10B-10N to internal interfaces to at least forwarding units 10B-10N. For example, lookup table 55 includes an entry that maps L2 address 25N to an internal interface to forwarding unit 10N. Internal interfaces may include the unique identifiers described above, an Ethernet interface, or other interface by which forwarding unit 10A may forward data packets to any of forwarding units 10B-10N.

Routing unit 32 of control plane 30A executes the routing functionality of wireless access gateway 16. In this respect, routing unit 32 represents hardware or a combination of hardware and software of control that implements with routing module 34 routing protocols by which routing information, stored in a routing information base 36 ("RIB 36"), may be exchanged with other routers. RIB 36 may include information defining a topology of a network, such as aspects of network system 2 of FIG. 1, e.g., the network between wireless access gateway 16 and mobile gateway 22. Routing module 34 may resolve the topology defined by routing information in RIB 36 to select or determine one or more routes through the network. For each of the selected routes, routing module 34 adds an entry to a route table that may specify, for the selected route, one or more outbound interfaces of various IFCs 50. The route table may be implemented as a radix tree having nodes that each key to a network address prefix, such as an IPv4/IPv6 network address prefix, and specify an outbound interface for the network address prefix. Routing module 34 may then update data plane 30B with this forwarding information directly or via resource manager 38, where forwarding units 10 of data plane 30B store the forwarding information in respective forwarding information bases 54A-54N ("FIBs 54"). Further details of one example embodiment of a router can be found in U.S. patent application Ser. No. 12/182,619, filed Jul. 30, 2008 and entitled "STREAMLINED PACKET FORWARDING USING DYNAMIC FILTERS FOR ROUTING AND SECURITY IN A SHARED FORWARDING PLANE," which is incorporated herein by reference.

Resource manager 38 of routing unit 32 allocates and manages resources of wireless access gateway 16 among service units 40 and forwarding units 10. In addition, resource manager 38 mediates communication among service units 40 and other components of routing 32, in particular, between session manager 44 and routing module 34 of routing unit 32.

Subscriber management service units 40 of control plane 30A may present a uniform L3 interface to downstream devices and provide decentralized subscriber session setup and management for wireless access gateway 16. The uniform L3 interface may include a single default gateway L3 (e.g., IPv4 or IPv6) address for wireless access gateway 16 for a WLAN access network. Thus, for example, all of subscriber management service units 40 may be addressable by the same IP address, and control messages destined for the same IP of subscriber management service units 40 may therefore be handled by any of the service units. Internally, each of subscriber management service units 40 may include a unique identifier that identifies the service unit to other components of wireless access gateway 16. Subscriber management service units 40 identifiers may include, for example, an index, slot, identifying string, internal IP address, or link layer address. Subscriber management service units 40 may each represent, for example, a packet forwarding engine (PFE) or other component of a physical interface card insertable within one or more chassis of wireless access gateway 16. The physical interface card may be, for instance, a multi-services dense port concentrator (MS-DPC). One or more of subscriber management service units 40 may also each represent a co-processor executing on a routing node, such as routing unit 32. Subscriber management service units 40 may be alternatively referred to as "service PICs" or "service cards." Each of subscriber management service units 40 includes substantially similar components to perform substantially similar functionality, said components and functionality being described hereinafter with respect to subscriber management service unit 40A (hereinafter, "service unit 40A"). Additional details regarding handling subscriber sessions with a decentralized control plane of multiple subscriber management service units may be found in U.S. patent application Ser. No. 13/172,556, entitled "MOBILE GATEWAY HAVING DECENTRALIZED CONTROL PLANE FOR ANCHORING SUBSCRIBER SESSIONS," filed Jun. 29, 2011, the entire contents being incorporated herein. In some examples, wireless access gateway 16 includes a less decentralized architecture and may include one or zero service units 40. In some cases, functionality attributed to service unit 40A may be performed by routing unit 32 or a control unit that does not execute routing protocols.

Session manager 44A of service unit 40A establishes sessions, requested by a subscriber via a WLAN access network for which wireless access gateway 16 operates as a network gateway, and manages the sessions once established. Each of subscriber management service units 40 includes an instance of session manager 44 and may therefore independently execute control plane protocols 46 required to establish a requested session for a subscriber. In this sense, the subscriber management service units 40 provide a form of a decentralized control plane for managing subscriber communication sessions. As a result, the wireless access gateway 16 may achieve increased scalability to handle thousands or millions of concurrent communication sessions from wireless devices accessing the WLAN access network.

Session manager 44 receives requests to create or update subscriber sessions and responsively creates or updates the sessions by executing control protocols 46 to receive session context information. In the illustrated example, IFC 50A of forwarding unit 10 receives L3 attach trigger 61, which packet processor 48A directs to service unit 40A via switch 56 in accordance with internal forwarding information in FIB 54A. L3 attach trigger 61 may represent a DHCP discover message, a DHCP request message, or a Router Solicitation or link layer Duplicate Address Request for IPv6, for instance. L3 attach trigger 61 indicates to wireless access gateway that a wireless device associated with the L3 attach trigger 61 is requesting attachment (or has already attached) to receive L3 services from wireless access gateway 16 and, by extension, from a mobile service provider network in some cases.

To create and anchor the requested session in session contexts 26A, session manager 44A authenticates and receives profile information for a subscriber and/or subscriber service identified in the request by executing AAA 46A. Session manager 44A may request or allocate an IP address from a DHCP server for the requested session by executing DHCP 46B. Session manager 44A may, e.g., implement a DHCP relay agent or DHCP a server in order to receive and/or serve a L3 address to the requesting wireless device. Session manager 44A may receive the L3 PDP address for requesting wireless device in a Create Session Response or Create PDP Context Response.

Session manager 44A may also negotiate with mobile service provider network devices such a mobile gateway 22 of FIG. 1, using GTP-C 46C messages, to create or modify a set of one or more bearers that carry service traffic for the requested session in GTP-U tunnels on a GTP-based or other mobility protocol-based interface between wireless access gateway 16 and a mobile service provider network. In this way, session manager 44A establishes session contexts 26A with session context information for the subscriber session associated with L3 attach trigger 61. These control protocols are described merely as examples, and session manager 44A may execute other protocols related to charging, for example, to receive additional session context information for the session, or other protocols for mobility management, attachment, L3 address allocation and assignment, and so forth.

The new session context stored in session contexts 26A for the subscriber session associated with L3 attach request 61 stores at least session context information either generated by or received by wireless access gateway 16 by executing control protocols 46. The session context information defines the operations to be performed on subscriber data traffic associated with the corresponding subscriber session. Such session context information may include, for example, the PDP (e.g., IP) address allocated by a DHCP server or another entity for the wireless device for use in sending and receiving subscriber packets, forwarding information used by forwarding units 10 in forwarding subscriber packets such as tunnel endpoint identifiers (TEIDs) and identifiers/addresses for downstream service nodes, the Access Point Name (APN) for the session, charging information, and one or more quality of service (QoS) profiles for the associated subscriber.

As control plane anchors for subscriber sessions, subscriber management service units 40 handle configuration of forwarding units 10 for constructing session-specific forwarding paths for processing and forwarding subscriber data traffic associated with the subscriber sessions. Session contexts 26A'-26N' (collectively, "session contexts 26'") of forwarding units 10 may each represent a subset of a chain of forwarding next hops that determine the operations applied to associated subscriber data traffic according to corresponding session contexts 26. Different session contexts of session contexts 26A may be spread across multiple session contexts 26' and thus multiple forwarding units 10. Example details on subscriber management service units 40 constructing subscriber-specific forwarding paths within forwarding units 10 can be found in Example details on internal forwarding paths of forwarding units 10 can be found in U.S. patent application Ser. No. 13/172,505, entitled "VARIABLE-BASED FORWARDING PATH CONSTRUCTION FOR PACKET PROCESSING WITHIN A NETWORK DEVICE," filed Jun. 29, 2011, the entire contents being incorporated herein by reference.

Any one of forwarding units 10 may operate as an anchoring forwarding unit for a particular one of session contexts 26 to perform forwarding functionality on subscriber packets associated with the corresponding subscriber session. In other words, processing subscriber data traffic for each of session contexts 26 may be handled by any of forwarding units 10 (i.e., the anchor forwarding unit 10 for the session and corresponding session context 26). The respective anchor forwarding units for upstream and downstream subscriber data traffic for a subscriber session may be the same forwarding unit or different forwarding units, where "downstream" refers to toward end-user devices such as wireless device 4 of FIG. 1 and "upstream" refers to toward a mobility anchor point such as mobile gateway 22 of FIG. 1.

Packet processors 48A-48N ("packet processors 48") of respective forwarding units 10 apply respective session contexts 26 to packets associated with subscriber sessions anchored in the data plane by the forwarding unit 10 that includes the packet processor. Each of packet processors 48 may represent computational components of a packet forwarding engine or network processor, for instance, and includes one or more general- or special-purpose processors, ASICs, ASSPs, FPGAs, or other programmable logic for forwarding packets in accordance with a corresponding one of FIBs 54 and processing packets in accordance with a corresponding one of session contexts 26. Packet processing operations applied by network processors 48 may include subscriber charging, firewall, protocol demultiplexing, tunnel encapsulation/decapsulation, internal forwarding, quality of service (QoS) policing, and route lookup operations. Packet processors 48 may alternatively be referred to as packet forwarding engines (PFEs).

In accordance with techniques of this disclosure, session manager 44A selects as, as a data plane anchor for a newly created or modified subscriber session, one of forwarding units 10 and sends associated L2 address 25 for the selected forwarding unit 10 (the "anchor forwarding unit 10") to the wireless device associated with the subscriber session in order to cause the wireless device to direct L2 traffic toward the associated L2 address 25 for the anchor forwarding unit 10. In the illustrated example, service unit 40A selects forwarding unit 10N to anchor the subscriber session for L3 attach trigger 61. Service unit 40A therefore issues reply message 27 including L2 address 25N associated with forwarding unit 10N but not associated with any of the other forwarding units 10. L2 address 25N may be a source L2 address for reply message 27 and/or an L2 address field of reply message 27. Reply message 27 may represent an ARP reply message.

In some cases, session manager 44A receives L3 attach trigger 61 and determines a previously selected anchor forwarding unit 10 for the associated subscriber session. In such cases, session manager 44A may determine a source L3 address of the L3 attach trigger 61 message and use the source L3 address as a lookup key to session contexts 26A managed by session manager 44A. The session context in session contexts 26A identifies the anchor forwarding unit 10N for the subscriber session, and session manager 44A therefore returns L2 address 25N in reply message 27.

Session manager 44A responds to a DHCP Discover message issued by a wireless device that issues L3 attach trigger 61 with a DHCP Offer message that provides a default gateway L3 address (e.g., a default gateway IP address) for wireless access gateway 16. In some cases, the provided default gateway L3 address is a loopback address for wireless access gateway 16 that may map to multiple L2 addresses, including, e.g., L2 addresses 25. In other words, rather than using an L3 address configured for any of the physical ports for IFCs 50 as a default gateway L3 address for wireless access gateway 16, session manager 44A provides a virtual address for the wireless access gateway 16, which may provide fault tolerance. Use of a loopback address for wireless access gateway 16 as a default gateway L3 address for the WLAN access network may result in packets for all subscriber sessions being received by any of IFCs 50A-50N.

Session manager 44A may apply a load balancing algorithm to load balance instances of session contexts 26A among different forwarding units 10. In other words, session manager 44A may apply the load balancing algorithm when selecting anchor forwarding units 10 for subscriber sessions. Because session manager 44A provides the L2 addresses 25 to enable internal steering of L2 packets to anchor forwarding units 10 for the L2 packets, session manager 44A may use simple load balancing algorithms such as round-robin to dynamically select anchor forwarding units 10 for subscriber sessions. Moreover, session manager 44A may use existing load balancing algorithms, for a subscriber session associated with any L3 address may be assigned by session manager 44A to any one of forwarding units 10 regardless of the L3 address and where the L3 address falls within a certain range, for example.

Subsequently, forwarding unit 10A receives subscriber data traffic from a WLAN access network in the form of an L2 packet 58 that includes L3 traffic associated with the subscriber session. Each of forwarding units 10 may be configured with each of L2 addresses 25 such that each forwarding unit 10 will ingress an L2 packet addressed to any of L2 addresses 25. In other words, each forwarding unit 10 is configured to receive L2 packets addressed to any of L2 addresses 25. Forwarding unit 10A determines the anchor forwarding unit 10N by mapping the destination L2 address to forwarding unit 10N using lookup table 55A, and then internally forwards L2 packet 58 by switch 56 to forwarding unit 10N associated with L2 address 25N for output via the outbound interface of corresponding IFCs 50 of the anchor forwarding unit 10N for the packet.

Packet processor 48N receives L2 packet 58 from switch 56, maps the L2 packet 58 to a session context in session contexts 26A and applies forwarding constructs to forward the subscriber packets according to the session context data. Anchor processing of the packets by packet processor 48N may include encapsulating the subscriber packets using GTP or PMIP, for instance, which may include setting the specified upstream TEID for the session within a GTP-U header, and additionally encapsulating the GTP packet in an IP header directing the packet toward the mobile gateway that participates in implementing the EPS or other 3GPP bearer for the subscriber session. Packet processor 48N may apply FIB 54N to outer IP header to lookup the route and output the traffic on an outbound interface of IFCs 50N that implements reference point S2a.

Figure 3:
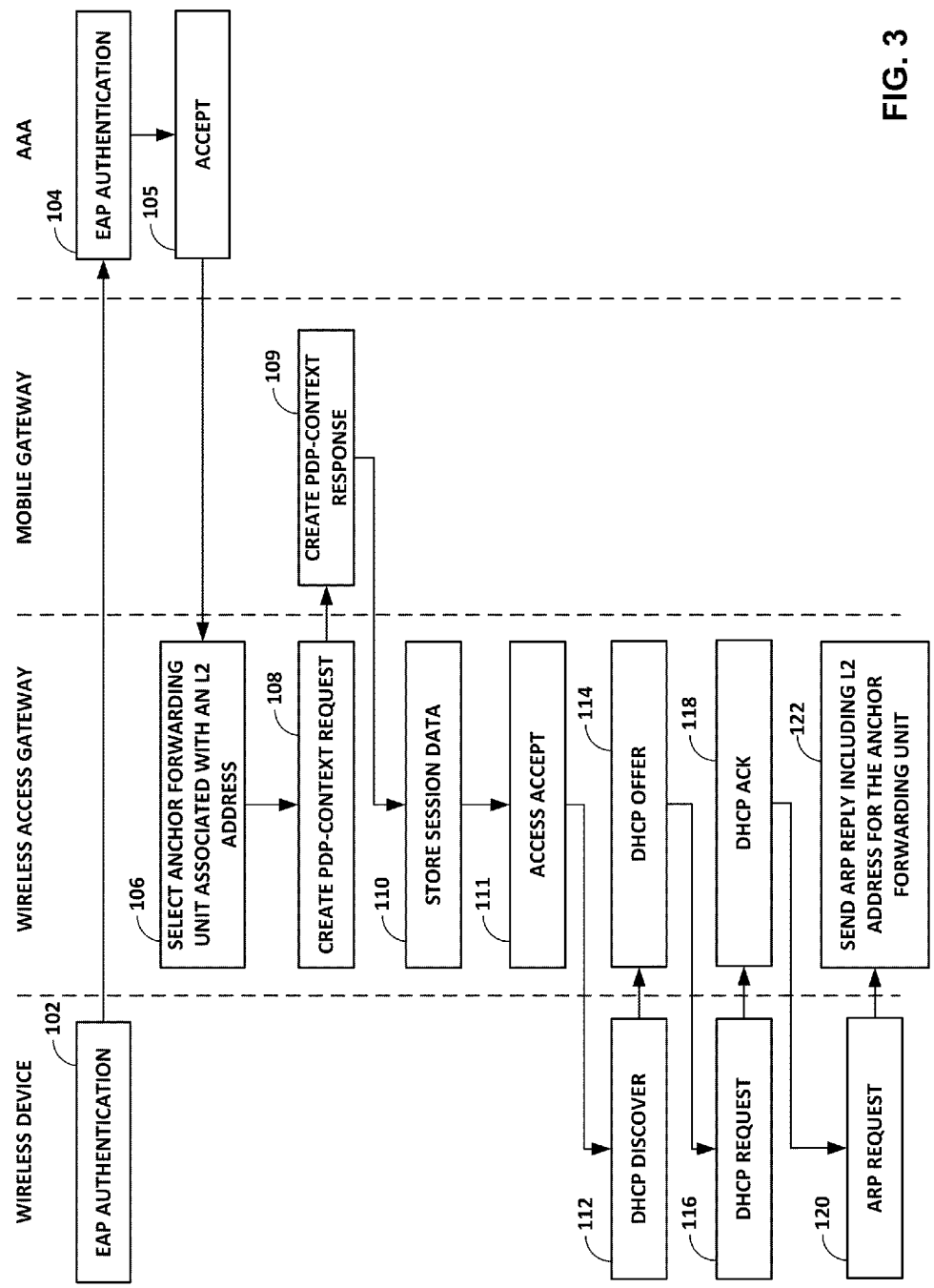
FIG. 3 is a flowchart illustrating an example mode of operation of a network system that includes a wireless access gateway having a plurality of forwarding units, according to techniques described herein.

FIG. 3 is a flowchart illustrating an example mode of operation of a network system that includes a wireless access gateway having a plurality of forwarding units, according to techniques described herein. The example of FIG. 3 illustrates operation of wireless device 4, a wireless access gateway 16, AAA server 13, and mobile gateway 22. Wireless device 4 in conjunction with access point 32 perform authentication to AAA server 13 (102, 104). Wireless device 4, access point 32, and AAA server 13 may use a form of EAP, such as EAP-TTLS or PEAP, as part of WLAN 802.1x authentication.

Upon successful authentication of wireless device 4, AAA server 16 optionally sends an APN for the subscriber to wireless access gateway 16 in an Access-Accept message, which may further include a ChargeableUserID (CUID) made up of the IMSI/MSISDN and (optionally) the APN as well as a derived Primary Master Key (PMK) as an encryption key (e.g., a Microsoft Point-to-Point Encryption (MPPE) key) (105). Wireless access gateway 16 continues establishment of the subscriber session for wireless device 4 by selecting, from among a plurality of forwarding units 10 of the wireless access gateway 16, an anchor forwarding unit 10A associated with an L2 address 25A (106).

To establish a subscriber session including a GTP-U tunnel for a service (which may be identified in the Create PDP-Context Request message by the optional APN or a default APN), wireless access gateway 16 uses GTP-C signaling and sends a Create PDP-Context Request message to mobile gateway 22 (108), which responds with a Create PDP-Context Response message including an IP address for wireless device 4 (109). In the context of an LTE architecture, GTP-C signaling may use Create Session Response/Request messages between wireless access gateway 16 and mobile gateway 22.

Wireless access gateway 16 may store an association between the UE MAC address and the IP address returned in the Create PDP-Context Response message in one of session contexts 26N (110). Wireless access gateway 16 may additionally forward an access accept message, e.g., a RADIUS Access-Accept message, to the wireless LAN access network 11 (111), which completes the authentication with wireless device 4.

Wireless device 4 may then obtain the IP address assigned by mobile gateway 22. In this example, wireless device 4 broadcasts a Dynamic Host Configuration Protocol (DHCP) Discover message (112) that received by wireless access gateway 16, which returns a DHCP Offer message that includes the IP address for the wireless device 4 and may include a default gateway IP address for wireless access gateway 16 (114). Wireless device 4 issues a DHCP Request message accepting the DHCP Offer (116), which is acknowledged by wireless access gateway 16 in a DHCP Ack message to complete the DHCP process and establish L3 connectivity (118).

Having an IP address, wireless access gateway 16 now broadcasts an ARP Request with the default gateway IP address for wireless access gateway 16 (120). Wireless access gateway 16 responds with an ARP reply that specifies the L2 address 26A for forwarding unit 10A for use as a destination L2 address for wireless access gateway 16.

Figure 4:
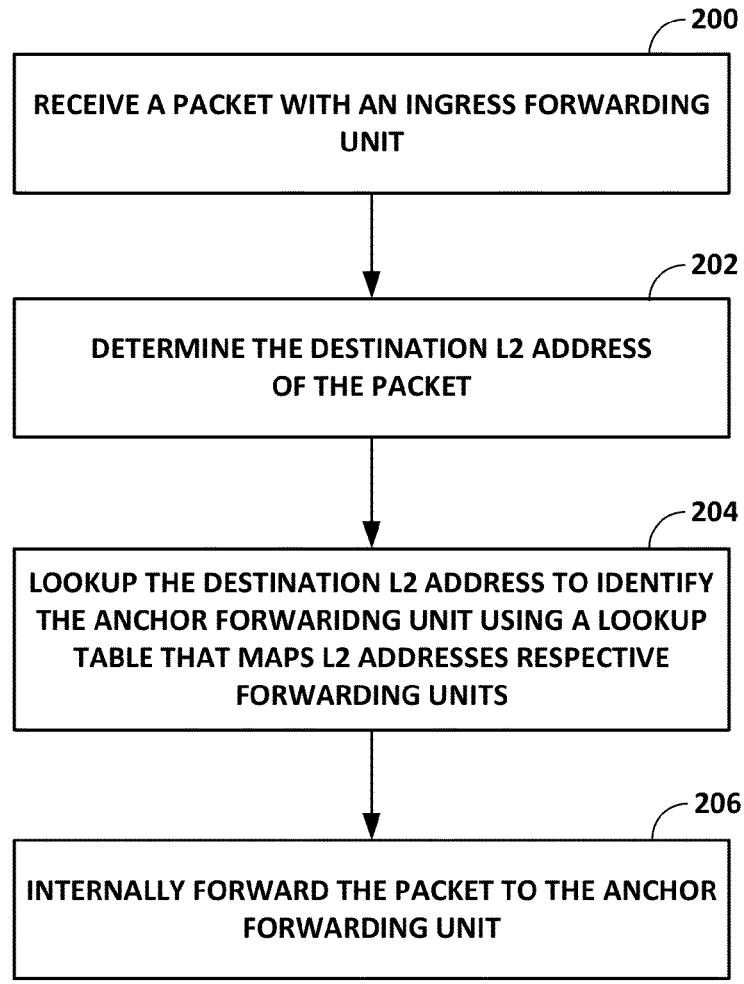
FIG. 4 is a flowchart illustrating an example mode of operation for a wireless access gateway connected to a wireless local area network (WLAN) access network and having a plurality of forwarding units for packet forwarding/processing.

FIG. 4 is a flowchart illustrating an example mode of operation for a wireless access gateway connected to a wireless LAN access network and having a plurality of forwarding units for packet forwarding/processing. The example mode of operation is described with respect to components of wireless access gateway 16 of FIG. 2. Ingress forwarding unit 10A of wireless access gateway 16 receives a packet on an interface facing wireless LAN access network 11 (200). Ingress forwarding unit 10A determines the destination L2 address of the packet (202) and uses the destination L2 address as a lookup key to lookup table 55A to identify anchor forwarding unit 10N for the subscriber session associated with the packet, where lookup table 55A maps L2 addresses 25 to respective forwarding units 10 (204). Ingress forwarding unit 10A then internally forwards, via switch 56, the packet to anchor forwarding unit 10N for processing (206).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
    selecting, by a wireless access gateway of a wireless local area network (WLAN) access network and for a wireless endpoint device attached to the WLAN access network, an anchor forwarding unit from a plurality of forwarding units to process packets received from the wireless endpoint device, wherein each forwarding unit of the plurality of forwarding units is uniquely associated with a different layer 2 address;
    outputting, by the wireless access gateway in response to receiving an address resolution protocol request issued by the wireless endpoint device to resolve a gateway layer 3 address for the wireless access gateway and based on the selecting of the anchor forwarding unit for the wireless endpoint device, an address resolution protocol response that associates the layer 2 address uniquely associated with the anchor forwarding unit and the gateway layer 3 address for the wireless access gateway; and
    processing, by the anchor forwarding unit using a subscriber session context for the wireless endpoint device, the packets received from the wireless endpoint device to remove layer 2 destination addresses of the packets that are the layer 2 address uniquely associated with the anchor forwarding unit and to generate corresponding packets for output via an upstream interface of the wireless access gateway.

2. The method of claim 1, further comprising:
    receiving, by an ingress forwarding unit from the plurality of forwarding units, a packet; and
    internally sending, by the ingress forwarding unit in response to determining a destination layer 2 address of the packet is the layer 2 address uniquely associated with the anchor forwarding unit, the packet to the anchor forwarding unit.

3. The method of claim 1,
    storing, by each forwarding unit from the plurality of forwarding units, a lookup table that uniquely associates each of the plurality of forwarding units with the different layer 2 addresses.

4. The method of claim 3, further comprising:
    receiving, by an ingress forwarding unit from the plurality of forwarding units, a packet; and
    internally sending, by the ingress forwarding unit based on the lookup table and in response to determining a destination layer 2 address of the packet is the layer 2 address uniquely associated with the anchor forwarding unit, the packet to the anchor forwarding unit.

5. The method of claim 1, further comprising:
    storing, by the wireless access gateway in response to selecting the anchor forwarding unit for the wireless endpoint device, the subscriber session context to the anchor forwarding unit, wherein the subscriber session context includes data usable by the anchor forwarding unit for processing packets associated with the wireless endpoint device for transmission via the upstream interface.

6. The method of claim 5, further comprising:
    receiving, by an ingress forwarding unit from the plurality of forwarding units, a packet; and
    internally sending, by the ingress forwarding unit based on the lookup table and in response to determining a destination layer 2 address of the packet is the layer 2 address uniquely associated with the anchor forwarding unit, the packet to the anchor forwarding unit.

7. The method of claim 1, further comprising:
receiving, by the wireless access gateway prior to receiving the address resolution protocol request, a dynamic host configuration protocol request from the wireless endpoint device; and
sending, by the wireless access gateway and in response to the dynamic host configuration protocol request, a dynamic host configuration protocol response that includes a loopback layer 3 address of the wireless access gateway as the gateway layer 3 address for the wireless access gateway.

8. The method of claim 1,
wherein the upstream interface comprises an upstream interface for a mobility tunneling protocol to a mobile gateway of a mobile service provider network, and
wherein generating the corresponding packets comprises generating corresponding packets each having a mobility tunneling protocol header and for output via the upstream interface.

9. A wireless access gateway for a wireless local area network (WLAN) access network, the wireless access gateway comprising:
a plurality of forwarding units internal to the wireless access gateway;
one or more processors configured to select, for a wireless endpoint device attached to the WLAN access network and by a wireless access gateway of the WLAN access network, an anchor forwarding unit from a plurality of forwarding units to process packets received from the wireless endpoint device, wherein each forwarding unit of the plurality of forwarding units is uniquely associated with a different layer 2 address,
wherein the one or more processors are further configured to output, in response to receipt of an address resolution protocol request issued by the wireless endpoint device to resolve a gateway layer 3 address for the wireless access gateway and based on selection of the anchor forwarding unit for the wireless endpoint device, an address resolution protocol response that associates the layer 2 address uniquely associated with the anchor forwarding unit and the gateway layer 3 address for the wireless access gateway,
wherein the anchor forwarding unit is configured to process, using a subscriber session context for the wireless endpoint device, the packets received from the wireless endpoint device to remove layer 2 destination addresses of the packets that are the layer 2 address uniquely associated with the anchor forwarding unit and to generate corresponding packets for output via an upstream interface of the wireless access gateway.

10. The wireless access gateway of claim 9,
wherein an ingress forwarding unit from the plurality of forwarding units is configured to receive a packet and internally send, in response to determining a destination layer 2 address of the packet is the layer 2 address uniquely associated with the anchor forwarding unit, the packet to the anchor forwarding unit.

11. The wireless access gateway of claim 9,
wherein each forwarding unit from the plurality of forwarding units is configured to store a lookup table that uniquely associates each of the plurality of forwarding units with the different layer 2 addresses.

12. The wireless access gateway of claim 11,
wherein an ingress forwarding unit from the plurality of forwarding units is configured to receive a packet and internally send, based on the lookup table and in response to a determination a destination layer 2 address of the packet is the layer 2 address uniquely associated with the anchor forwarding unit, the packet to the anchor forwarding unit.

13. The wireless access gateway of claim 9,
wherein the one or more processors are further configured to store, in response to selection of the anchor forwarding unit for the wireless endpoint device, the subscriber session context to the anchor forwarding unit, wherein the subscriber session context includes data usable by the anchor forwarding unit for processing packets associated with the wireless endpoint device for transmission via the upstream interface.

14. The wireless access gateway of claim 13,
wherein an ingress forwarding unit from the plurality of forwarding units is configured to receive a packet and internally send, in response to a determination a destination layer 2 address of the packet is the layer 2 address uniquely associated with the anchor forwarding unit, the packet to the anchor forwarding unit.

15. The wireless access gateway of claim 9,
wherein the one or more processors are further configured to receive, prior to receipt of the address resolution protocol request, a dynamic host configuration protocol request from the wireless endpoint device, and
wherein the one or more processors are further configured to send, in response to the dynamic host configuration protocol request, a dynamic host configuration protocol response that includes a loopback layer 3 address of the wireless access gateway as the gateway layer 3 address for the wireless access gateway.

16. The wireless access gateway of claim 9,
wherein the upstream interface comprises an upstream interface for a mobility tunneling protocol to a mobile gateway of a mobile service provider network, and
wherein to generate the corresponding packets the anchor forwarding unit is configured to generate corresponding encapsulated packets each having a mobility tunneling protocol header and for output via the upstream interface.

17. A non-transitory computer-readable medium comprising instructions for causing one or more programmable processors of a wireless access gateway for a wireless local area network (WLAN) access network to:
select, for a wireless endpoint device attached to the WLAN access network, an anchor forwarding unit from a plurality of forwarding units to process packets received from the wireless endpoint device, wherein each forwarding unit of the plurality of forwarding units is uniquely associated with a different layer 2 address; and
output, in response to receiving an address resolution protocol request issued by the wireless endpoint device to resolve a gateway layer 3 address for the wireless access gateway and based on the selecting of the anchor forwarding unit for the wireless endpoint device, an address resolution protocol response that associates the layer 2 address uniquely associated with the anchor forwarding unit and the gateway layer 3 address for the wireless access gateway;
process, by the anchor forwarding unit using a subscriber session context for a subscriber session for the wireless endpoint device, the packets received from the wireless endpoint device to remove layer 2 destination addresses of the packets that are the layer 2 address uniquely associated with the anchor forwarding unit and to generate corresponding packets for output via an upstream interface of the wireless access gateway.

18. The non-transitory computer-readable medium of claim 17, wherein the instructions further cause the one more programmable processors to:
receive, by an ingress forwarding unit from the plurality of forwarding units, a packet; and
internally send, by the ingress forwarding unit in response to determining a destination layer 2 address of the packet is the layer 2 address uniquely associated with the anchor forwarding unit, the packet to the anchor forwarding unit.

19. The non-transitory computer-readable medium of claim 17, wherein the instructions further cause the one more programmable processors to:
store, by each forwarding unit from the plurality of forwarding units, a lookup table that uniquely associates each of the plurality of forwarding units with the different layer 2 addresses.

20. The non-transitory computer-readable medium of claim 19, wherein the instructions further cause the one more programmable processors to:
receive, by an ingress forwarding unit from the plurality of forwarding units, a packet; and
internally send, by the ingress forwarding unit based on the lookup table and in response to determining a destination layer 2 address of the packet is the layer 2 address uniquely associated with the anchor forwarding unit, the packet to the anchor forwarding unit.

21. The non-transitory computer-readable medium of claim 17, wherein the instructions further cause the one more programmable processors to:
store, by the wireless access gateway in response to selecting the anchor forwarding unit for the wireless endpoint device, the subscriber session context to the anchor forwarding unit, wherein the subscriber session context includes data usable by the anchor forwarding unit for processing packets associated with the wireless endpoint device for transmission via the upstream interface.

22. The non-transitory computer-readable medium of claim 21,
wherein the instructions further cause the one more programmable processors to:
receive, by an ingress forwarding unit from the plurality of forwarding units, a packet; and
internally send, by the ingress forwarding unit based on the lookup table and in response to determining a destination layer 2 address of the packet is the layer 2 address uniquely associated with the anchor forwarding unit, the packet to the anchor forwarding unit.

23. The non-transitory computer-readable medium of claim 17,
wherein the upstream interface comprises an upstream interface for a mobility tunneling protocol to a mobile gateway of a mobile service provider network, and
wherein to generate the corresponding packets the instructions further cause the one more programmable processors to generate, by the anchor forwarding unit, corresponding encapsulated packets each having a mobility tunneling protocol header and for output via the upstream interface.

* * * * *